(12) United States Patent
Vogler et al.

(10) Patent No.: US 9,861,024 B2
(45) Date of Patent: Jan. 9, 2018

(54) PATH PLANNING METHOD FOR VEHICLE GUIDANCE

(71) Applicants:AGCO CORPORATION, Duluth, GA (US); AGCO INTERNATIONAL GMBH, Neuhausen am Rheinfall (CH); Theo Volger, Bad Worishofen (DE); Ludwig Grandl, Olching (DE); Bastain Kieninger, Lahr (DE)

(72) Inventors: Theo Vogler, Bad Worishofen (DE); Ludwig Grandl, Olching (DE); Bastain Kieninger, Lahr (DE)

(73) Assignee: AGCO International GmbH, Neuhausen (CH)

( * ) Notice: Subject to any disclaimer, the term of this patent is extended or adjusted under 35 U.S.C. 154(b) by 18 days.

(21) Appl. No.: 14/654,067

(22) PCT Filed: Nov. 12, 2013

(86) PCT No.: PCT/US2013/069684
§ 371 (c)(1),
(2) Date: Jun. 19, 2015

(87) PCT Pub. No.: WO2014/105281
PCT Pub. Date: Jul. 3, 2014

(65) Prior Publication Data
US 2015/0331423 A1   Nov. 19, 2015

(30) Foreign Application Priority Data
Dec. 25, 2012  (GB) .................................. 1223363.1

(51) Int. Cl.
*A01B 69/04*    (2006.01)
*A01B 71/02*    (2006.01)
(Continued)

(52) U.S. Cl.
CPC ............ *A01B 69/008* (2013.01); *A01B 71/02* (2013.01); *G01C 21/00* (2013.01); *G05D 1/0219* (2013.01); *G05D 2201/0201* (2013.01)

(58) Field of Classification Search
CPC ....... G05D 2201/02; G05D 2201/0201; G05D 1/0219; G05D 1/0274; G05D 1/0287; G05D 1/0291
See application file for complete search history.

(56) References Cited

U.S. PATENT DOCUMENTS 5,648,901 A * 7/1997 Gudat ................ B60K 31/0008
                                                701/23
6,085,130 A * 7/2000 Brandt ................ G05D 1/0278
                                                701/26
(Continued)

FOREIGN PATENT DOCUMENTS

| EP | 1844420 A2 | 10/2007 |
| EP | 1915894 A2 | 4/2008 |
| EP | 2499546 A1 | 9/2012 |

OTHER PUBLICATIONS

U.S. International Search Authority, International Search Report for International Patent Application No. PCT/US2013/069684, dated May 2, 2014.

(Continued)

*Primary Examiner* — John R Olszewski
*Assistant Examiner* — Tommy Worden

(57) ABSTRACT

A method for defining a contoured path for an automatic guidance system comprises defining a plurality of reference path segments; for each segment, determining one or more intersection points respectively with other segments; and subsequently defining a contoured path as a sequence of intersecting segments. An automatic guidance system based on the method is also provided.

18 Claims, 13 Drawing Sheets

(51) Int. Cl.
*G01C 21/00* (2006.01)
*G05D 1/02* (2006.01)

(56) References Cited

U.S. PATENT DOCUMENTS

| | | | | |
|---|---|---|---|---|
| 6,199,000 | B1* | 3/2001 | Keller | A01B 79/005 |
| | | | | 342/357.52 |
| 6,553,299 | B1* | 4/2003 | Keller | A01B 79/005 |
| | | | | 111/200 |
| 8,954,216 | B2* | 2/2015 | Yazaki | A01D 34/008 |
| | | | | 701/24 |
| 9,081,383 | B1* | 7/2015 | Montemerlo | G05D 1/0212 |
| 2001/0012981 | A1* | 8/2001 | Yamashita | G01C 21/3626 |
| | | | | 701/410 |
| 2004/0193348 | A1* | 9/2004 | Gray | A01B 69/008 |
| | | | | 701/50 |
| 2005/0182605 | A1* | 8/2005 | Agrawala | G01C 21/367 |
| | | | | 703/2 |
| 2005/0192749 | A1* | 9/2005 | Flann | A01B 69/008 |
| | | | | 701/301 |
| 2007/0233374 | A1* | 10/2007 | Diekhans | G01C 21/20 |
| | | | | 701/533 |
| 2008/0103694 | A1* | 5/2008 | Dix | A01B 69/008 |
| | | | | 701/425 |
| 2010/0185366 | A1 | 5/2010 | Heiniger et al. | |
| 2010/0185364 | A1* | 7/2010 | McClure | A01B 69/008 |
| | | | | 701/41 |
| 2013/0282224 | A1* | 10/2013 | Yazaki | A01D 34/008 |
| | | | | 701/24 |
| 2014/0190514 | A1* | 7/2014 | Lamon | G05D 1/0219 |
| | | | | 134/6 |

OTHER PUBLICATIONS

Intellectual Property Office, International Search Report for UK Patent Application No. GB12233631, dated Apr. 25, 2013.

* cited by examiner

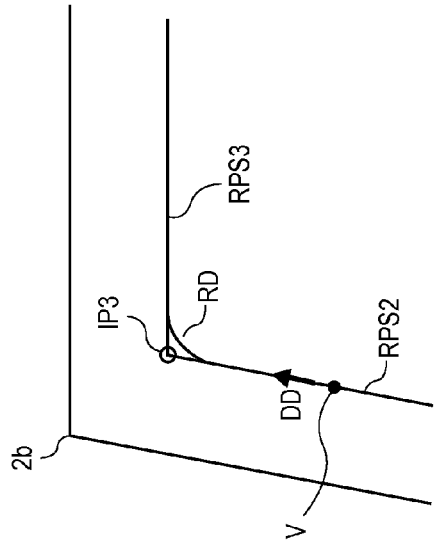
FIG. 3A
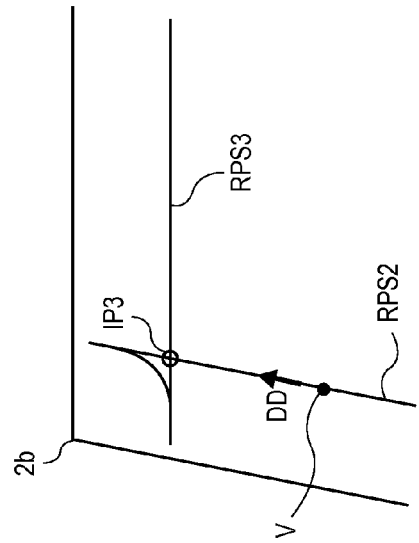
FIG. 3B
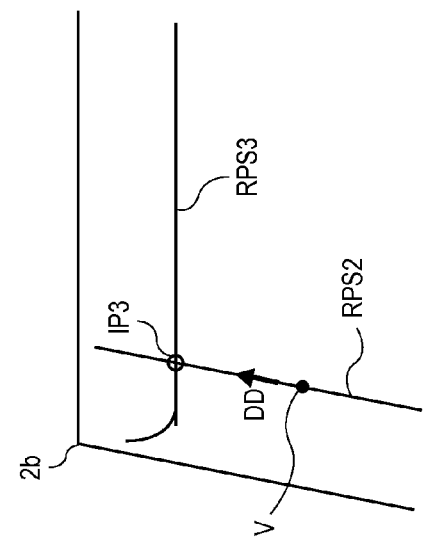
FIG. 4A
FIG. 4B

PATH PLANNING METHOD FOR VEHICLE GUIDANCE

FIELD

The present invention relates to methods for defining paths to be followed by a vehicle, in particular an agricultural vehicle working a field, and to automatic guidance systems implementing those methods.

BACKGROUND

In general when using an automatic guidance/steering (AG) system, the operator defines a path which is used as a reference or guide when travelling the work area (field). The path may be stored in the system such that it can be restored manually by the operator or automatically where, for example, the system identifies the field using a global navigation satellite system (GNSS) position of the vehicle and the GPS position of the field with the predefined path. Once a path is stored, it can then subsequently be used for different machines or applications whereby settings (e.g., working width and overlap) may be adapted for each vehicle or application type (e.g., a tractor with a tillage implement or a combine). The reference path may initially be defined manually using, for example, the A/B mode, the A+ mode, the pivot mode and/or the contour mode.

In the A/B mode, the path is defined by driving from a point A to a point B defining a straight path reference line. The initial reference line is then offset according to one or more geometry settings of the machine (e.g., a width of the machine and overlapping). At the end of the field, the operator deactivates AG by manually steering, turns the vehicle, and activates AG again, wherein the AG system steers the machine along the next line.

In the A+ mode, the path is defined by driving to a point A and adjusting an angle (e.g., with reference to the cardinal directions: NORTH is 0°, SOUTH is 180°, etcetera) to define a straight reference line intersecting the point A and running at the defined angle. Headland turning in the A+ mode is similar to headland turning in the A/B mode.

In the pivot mode, the vehicle is driven around a circular arc thereby defining a circular reference path with a center and a radius. Once the vehicle completes a circle, the AG system guides the vehicle to the next (inner) circular path. There is no headland turning in this mode.

The contour mode is used in fields with curved or complex field boundaries. The vehicle is driven along a path surrounding the work area, wherein the driven path is recorded as the reference path. There is no headland turning in this mode.

With reference to FIG. 1 of the accompanying drawings, use of the contour mode to define a path is described in more detail. A major requirement for the recording of reference path line 1 is that it can be used for various applications. A reference path line RP can then be taken to define the calculated path CP and subsequent path lines SP for the respective operations. By changing application settings like working width (width of the implement or combine header) and overlap (area which is passed twice) the subsequent path lines SP can be calculated very easily. Due to the irregular field boundary especially in small structured regions (e.g. in Mid Europe), the contour mode is used more frequently.

An agricultural vehicle V is driving in the contour recording mode along the boundary 1 of a field F which is to be worked whereby a driven path 1 is recorded. At the edges 2*b* of field F and depending on the agricultural application (during which the path definition is recorded), the vehicle passes a curve 1*a* with a respective driven radius RD which may vary during recording or may be too small for other vehicle combinations (e.g., when the reference line is recorded with a small saddled broadcast seeder and the next operation is with a very long plough needing much greater turn radius).

To meet the requirement that the reference path line 1 can be used for additional, different operations, the radius RD is corrected by overriding with a standard radius RS (e.g., 10 meters) shown by the inner curved line. So a calculated path line CP (driven path 1 with amended radiuses RS) is then recorded. As a consequence, the difference between the two radiuses RD and RS results in areas which may not be worked when using the calculated path CP or subsequent path SP line. Due to liability issues this standard radius RS cannot be changed by the operator to avoid damage during automated steering.

A further disadvantage of the contour mode relates to the fact that in some applications, a corner cannot be passed by driving a curve. A combine harvester with a wide header, for example, may not be able to pass a curve as the loading of the header would be unbalanced, impacting the function of the feeder system. Furthermore, tractors with large ploughs also may not be able to pass the corners with a curve when the plough is engaged with the soil. In both of these scenarios the vehicles are forced to pass the corners with headland maneuvers.

To overcome this problem operators must abort contour mode at every corner and on subsequent path lines SP. This results in substantial manual intervention, introducing the risk of human error and compromising operational comfort and ease of use.

The above section provides background information related to the present disclosure which is not necessarily prior art.

SUMMARY

It is an object of the present invention to mitigate the above-mentioned problems by providing an improved system and method for defining a contoured reference path line for an automatic guidance system.

In accordance with a first aspect of the present invention there is provided a method for defining a contoured path for an automatic guidance system, the method comprising defining a plurality of reference path segments; for each segment, determining one or more intersection points respectively with other segments; and defining a contoured path as a sequence of intersecting segments. Suitably, the defined reference path segments exclude the turns into corners (that is, rounded corners) and instead are extended based on the path of the segment.

Other features and aspects of the present invention are defined in the attached claims to which reference should now be made.

DRAWINGS

Embodiments of the present invention are described in detail below with reference to the attached drawing figures, wherein:

FIGS. 2-11 illustrate the generation of a contoured path and the integration of headland maneuver's in methods embodying aspects of the present invention.

Figure 1:
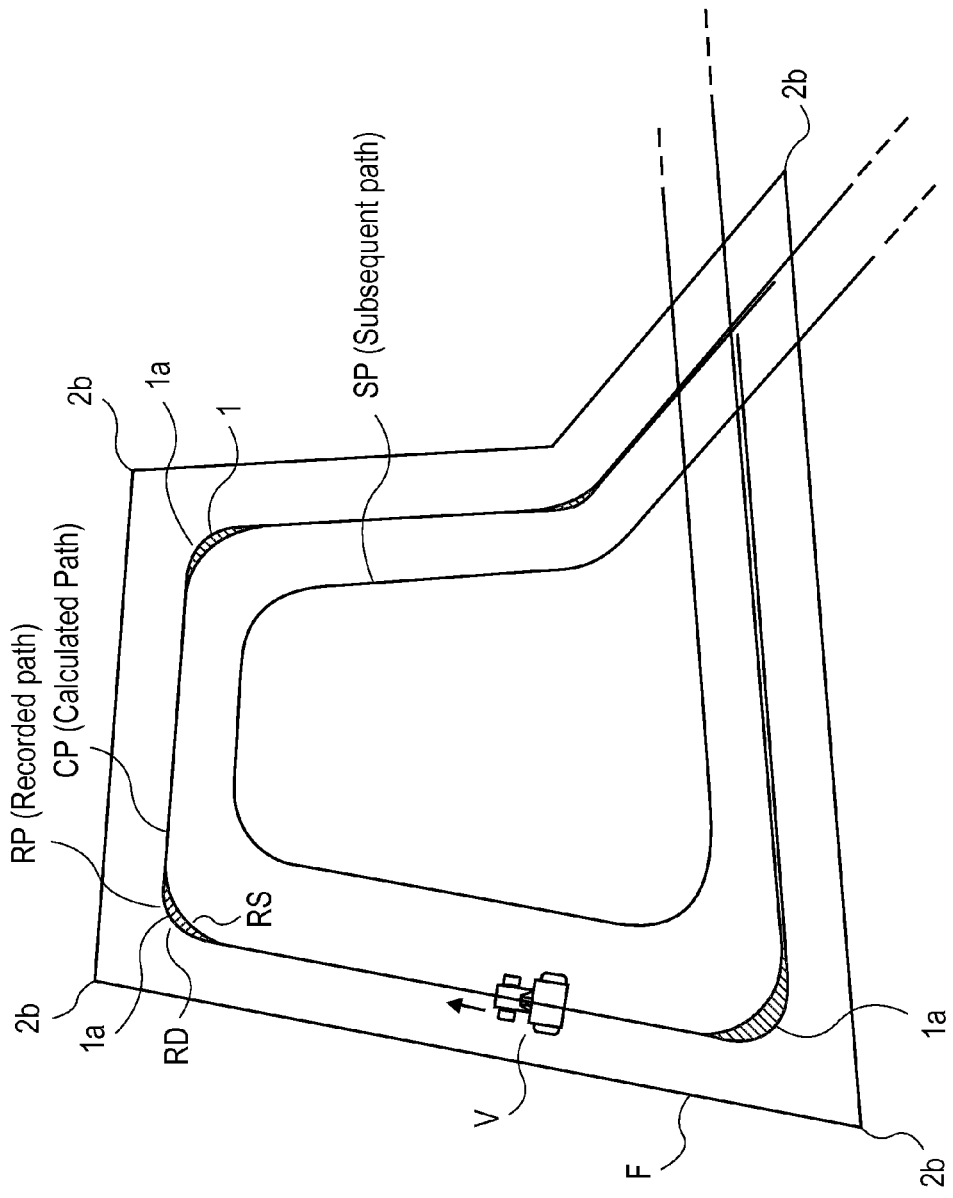
FIG. 1 illustrates the generation of a contoured path for an automatic guidance system using a known method as described above.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
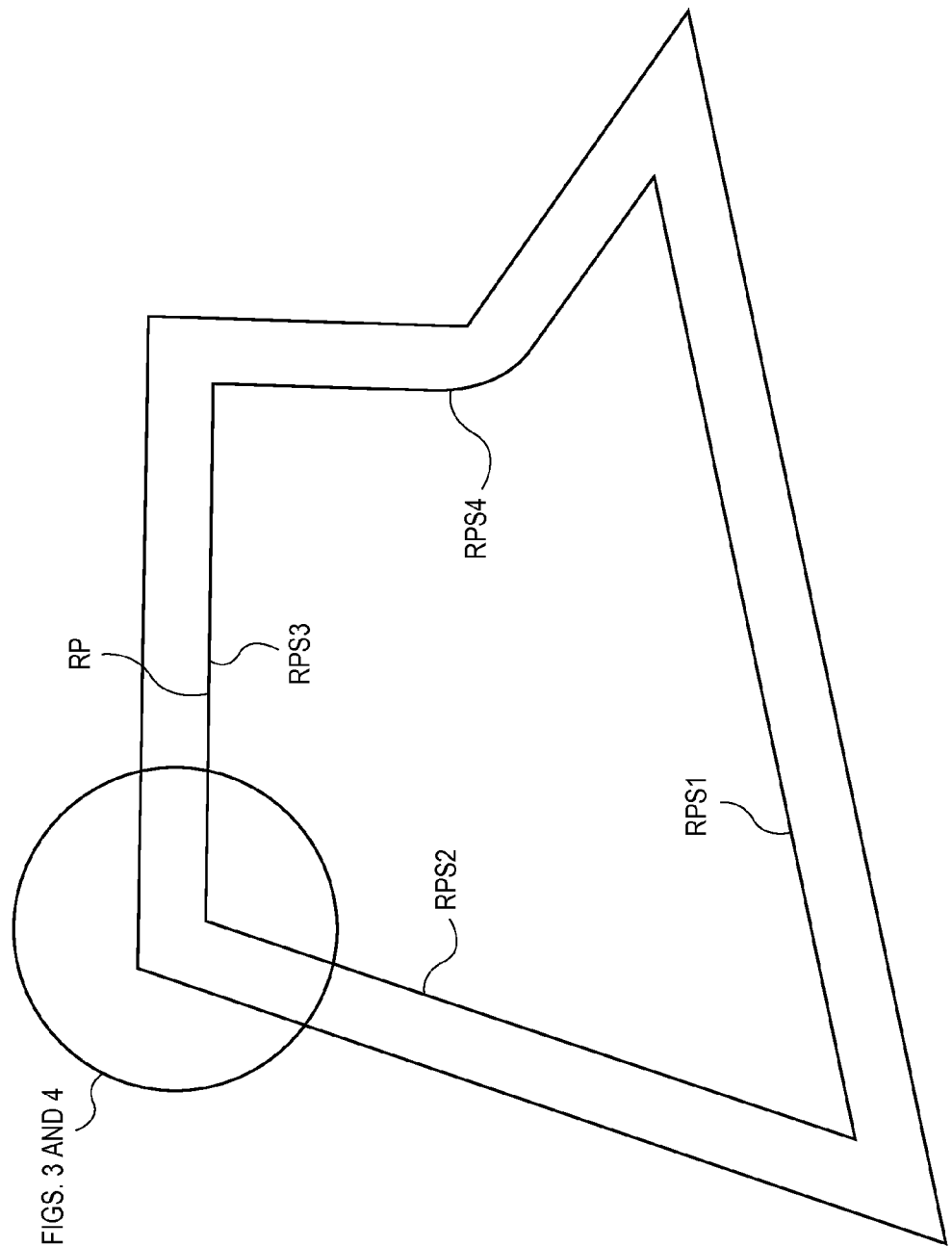

The basic concept of embodiments of the present invention is to split the overall contoured reference path line RP into segments with sharp corners or edges, as shown in FIG. 2. In FIG. 2 the contoured reference path line RP is split into reference path line segments RPS1-RPS4. Various exemplary methods for splitting the contour reference path into segments are described below with reference to FIGS. 3a, 3b, 4a and 4b. The ends of each single section are extended in a straight line such that the reference path line segments intersect at sharp corners or edges.

A method of manually defining an intersection point IP is depicted in FIG. 3a. According to this method the vehicle V approaches the corner or edge 2b driving in the direction shown by arrow DD. Due to an implement attached to the vehicle (which prohibits using the standard contour mode), the vehicle V is performing a headland maneuver. During this headland maneuver, the driver activates the segmentation function by pressing a button (e.g., a Start/Pause button) which results in the AG system setting point IP3'. After the headland maneuver the recording of the points is resumed by pressing a button (e.g., an End/Pause button) and a point IP3" is set. Based on these two points (IP3' and IP3") the system calculates the intersection point IP3. Once the point IP3 is determined, it will be recorded while points IP3' and IP3" are discarded. Based on IP3 the system calculates the sections RPS2 and RPS3.

Alternatively, the system may automatically recognize a headland maneuver or an intersection of two path lines even if the path lines are curved. So the intersection point IP is automatically determined.

A method of automatically defining an intersection point IP by detecting a minimum turn radius is depicted in FIG. 3b. The automatic determination of an intersection point IP may also be applicable when using the normal contour mode for recording a reference line by driving a curve on the edges 2b as shown in FIG. 3b. Similar to what was described in FIG. 1, the vehicle V (with no implement or a small implement allowing sharp curves) approaches on segment RPS2 to corner 2b and drives a curve with radius RD into a direction aligned with next segment RPS3. The system detects that radius RD is smaller than the minimum radius RS and automatically sets an intersection point IP3. The system may determine intersection point IP3 by geometrically extending the driven path lines RPS2 and RPS3 until they intersect, wherein the intersection is defined as IP3. The driver is then informed that the system detected an intersection point and the driver can accept it or not. The system may also include a procedure to inform the driver if the automatic segmentation procedure does not work. The driver could then be asked for manual input based on system suggestions on the displayed map provided on a screen in the vehicle cab.

Furthermore, a minimum radius RM could be defined (which could be the standard radius RS or a larger value according the driver's setting chosen for an application) so that when a curve with sufficient radius is driven along a path segment or between two path segments, the intersection point IP determination, and thereby the segmentation, is aborted. Thus, individual path segments may be straight or may include one or more arcuate sections, wherein each of the arcuate sections presents a radius of curvature greater than the minimum radius RM. Alternatively, in this case the driver could be provided with a pop-up asking whether the reference path at this edge should be segmented or not.

A method of automatically defining an intersection point IP by detecting a crossing point is depicted in FIGS. 4a and 4b. The automatic determination of an intersection point IP may also be applicable when using the normal contour mode for recording a reference line by detecting a crossing point as shown in FIGS. 4a and 4b. Similar to what was described in FIG. 1, the vehicle V approaches on segment RPS2 to corner 2b and drives a headland maneuver. The system can determine intersection point IP3 at the crossing point. The driver is then informed that the system detected an intersection point and the driver can accept it or not. The system may also include a procedure to inform the driver if the automatic segmentation procedure does not work. The driver could then be asked for manual input based on system suggestions on the displayed map.

As will be appreciated, it is not necessary that the reference path segments be driven as part of the process. For example, the reference path may be created by adding offsets to known field boundary positions within the system, then handling segmentation and the generation of intersection points.

Figure 5:
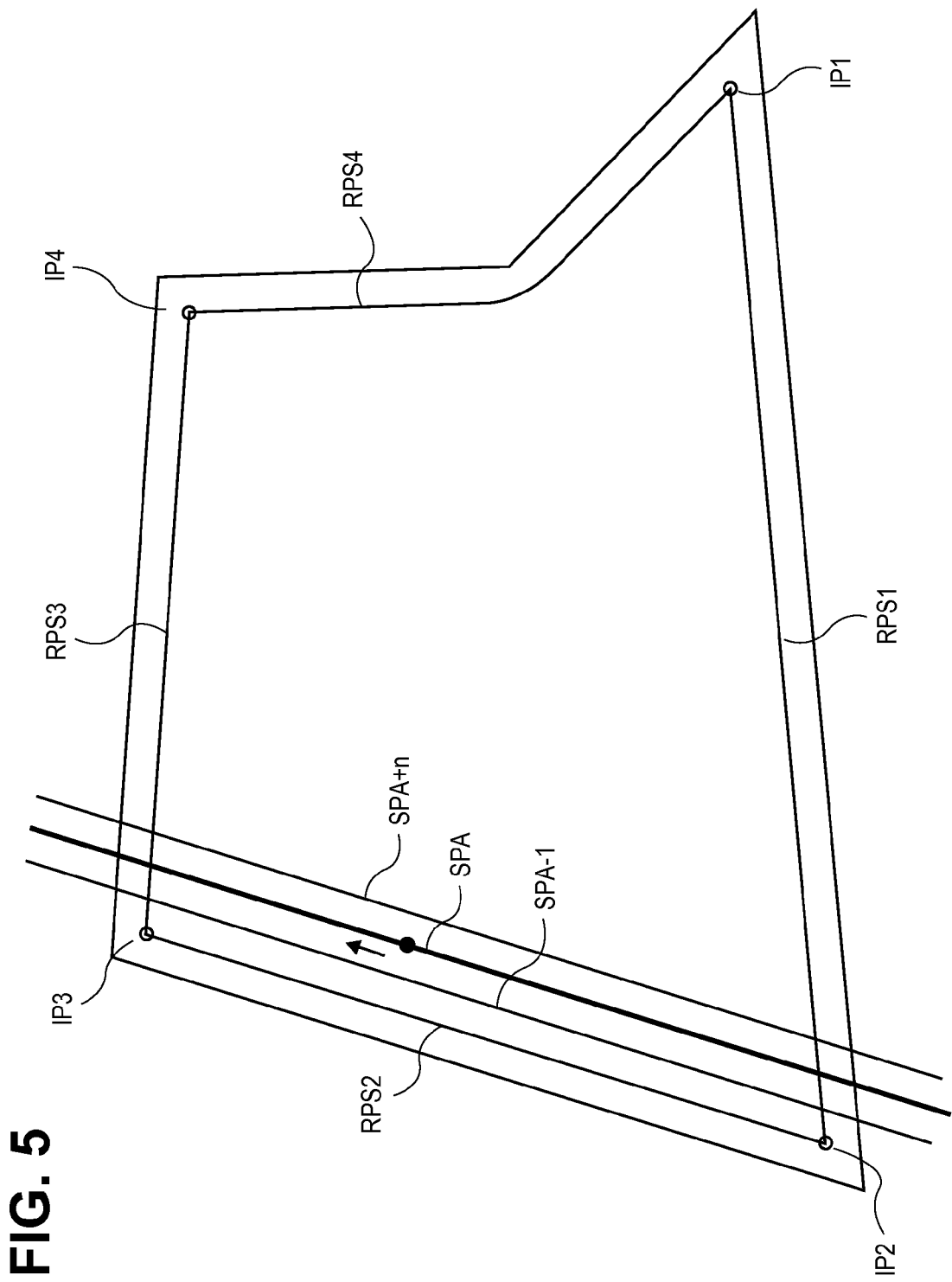

As shown in FIG. 5, at the end of the reference path record process, a final reference path line RPF consisting of various segments RPS1 to RPS4 and intersection points IP1 to IP4 can be stored in the system whereby the segments can include radiuses as described above. Final reference path line RPF can then be taken to calculate subsequent path lines SPA to SPA±X.

Figure 11:
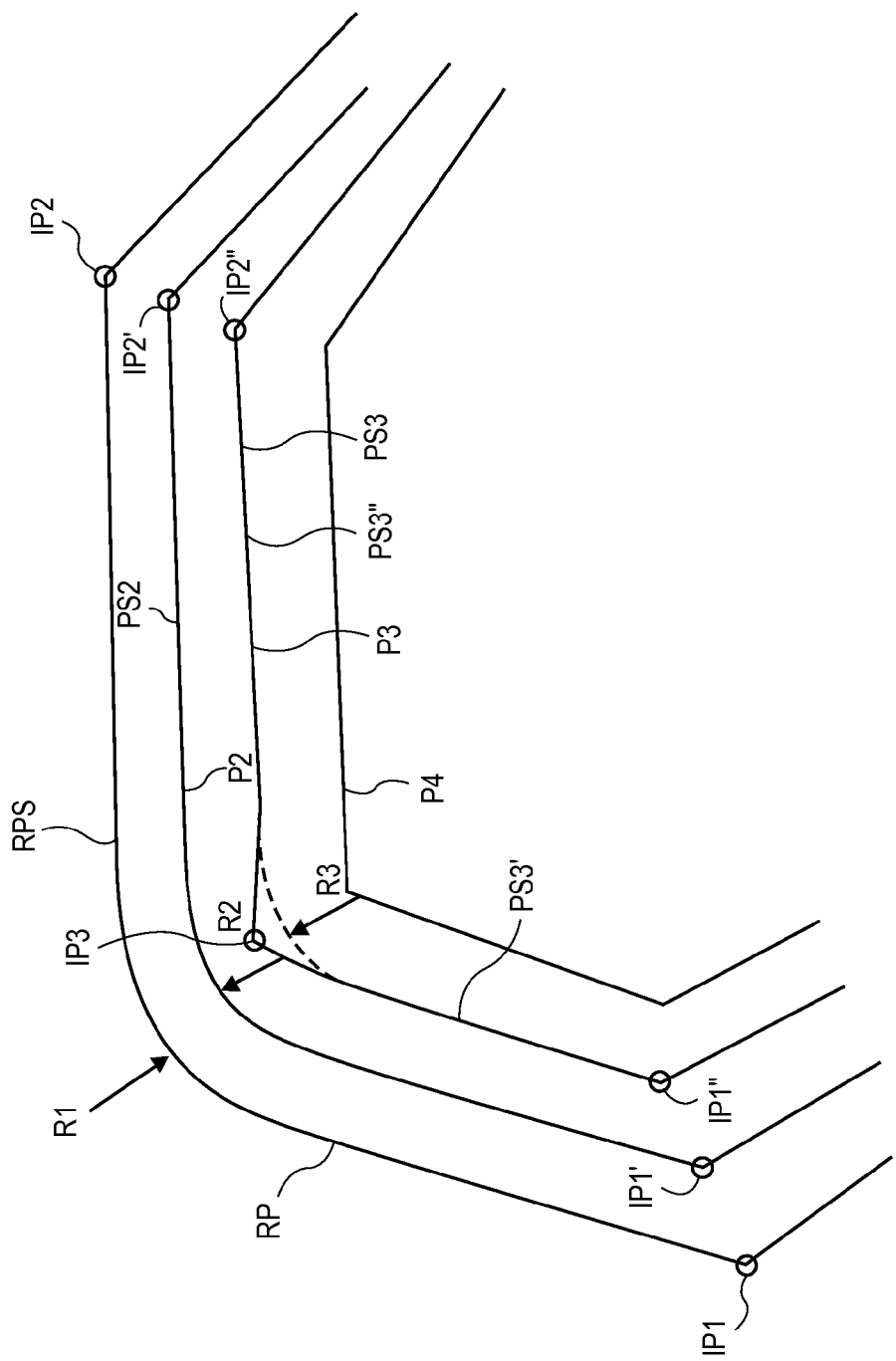

The process of segmentation can also be applied during the generation of subsequent path lines according to various methods. With particular reference to FIG. 11, a reference path line RP may include a path segment with a curved section of radius R1 in the initial definition. If the subsequent path lines P2, P3, P4, etcetera are generated by offsetting said reference path line towards the inner side of the curve, as illustrated, a subsequent path line may have a corresponding curve with a smaller radius of curvature. If the curve has a smaller radius compared to the minimum radius RS the system may split said path segment into two and replace the curved section with an intersection point according to, for example, the method described above and illustrated in FIG. 3b.

Conversely, a reference path line may include two path segments intersecting at a point while a subsequent path may merge the two path segments and replace the intersection point with a curve. The intersection point on the reference path may result from the minim radius requirement or by any methods described in FIGS. 3a, 3b, 4a, 4b. If subsequent path lines SPA are generated by offsetting said reference path line or reference path line segments, the system may replace two adjacent path segments by one segment with a respective curve with a radius greater then a predetermined minimum radius. This may be advantageous as the path with reduced segments can be travelled more efficient without leaving unworked field areas.

If the system is adapting the segment definition during subsequent path line generation, the path segments being different from the strict offset of the reference path may be highlighted in the display so that the operator can accept or overwrite the amendments.

In some embodiments of the invention, only the current active path of the active segment (SPA of RPS2 in FIG. 5)±X path is shown on an operator's display.

During operation, the system may automatically select a next path segment to be driven using one or more methods. According to a first method, the system calculates angles to adjacent path lines. In a first step, the two closest path sections are chosen by calculating the perpendicular distances of each point of each adjacent or proximate path segment and the vehicle's position. As each point on the path or path segment is defined by coordinates and an angle (with respect to next or previous points on the path) the basis for considering perpendicularity to the orientation at this point on a section is provided. This is especially needed for path lines/segments with a curvature. So for each point, the distance perpendicular to the orientation/angle of the point to the position of the vehicle can be determined so that the two adjacent sections can be selected. Alternatively, other methods may be used to identify two adjacent sections. The system may generate an imaginary circle around the vehicle position, for example, and increase the diameter until two different sections are cut by that circle.

Figure 6A:
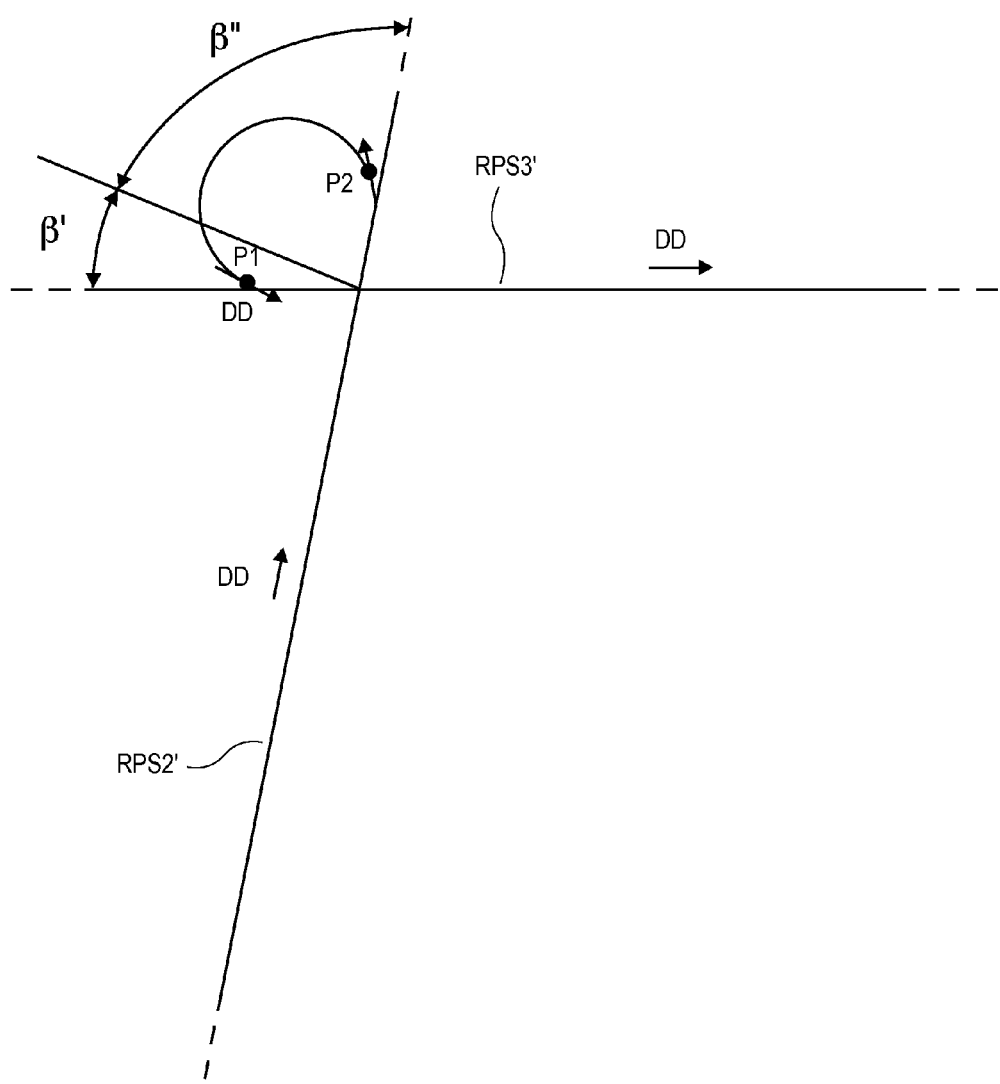

In a next step, the system determines an angle between the driving direction or orientation of the vehicle and each of the two closest path sections and determines which of the two angles is the smallest. As illustrated in FIG. 6a, if the vehicle is in the position represented by point P1 the system calculates the two angles β' and β" to the sections RPS2' and RPS3'. The angle β' is smaller than the angle β", therefore the path segment RPS3' is selected as guidance target. If, for example, the vehicle were at point P2 the system may choose the other segment RPS2'.

Any of various methods may be used to define angles between the vehicle's driving direction/orientation and path sections. By way of example, the angle between the orientation of a point on the section and the orientation of the vehicle can be determined directly or by assigning each angle to the cardinal system used in guidance systems (described above with A+ mode) wherein NORTH is 0° and SOUTH is 180°, and then calculating the difference between these cardinal angles.

Figure 6B:
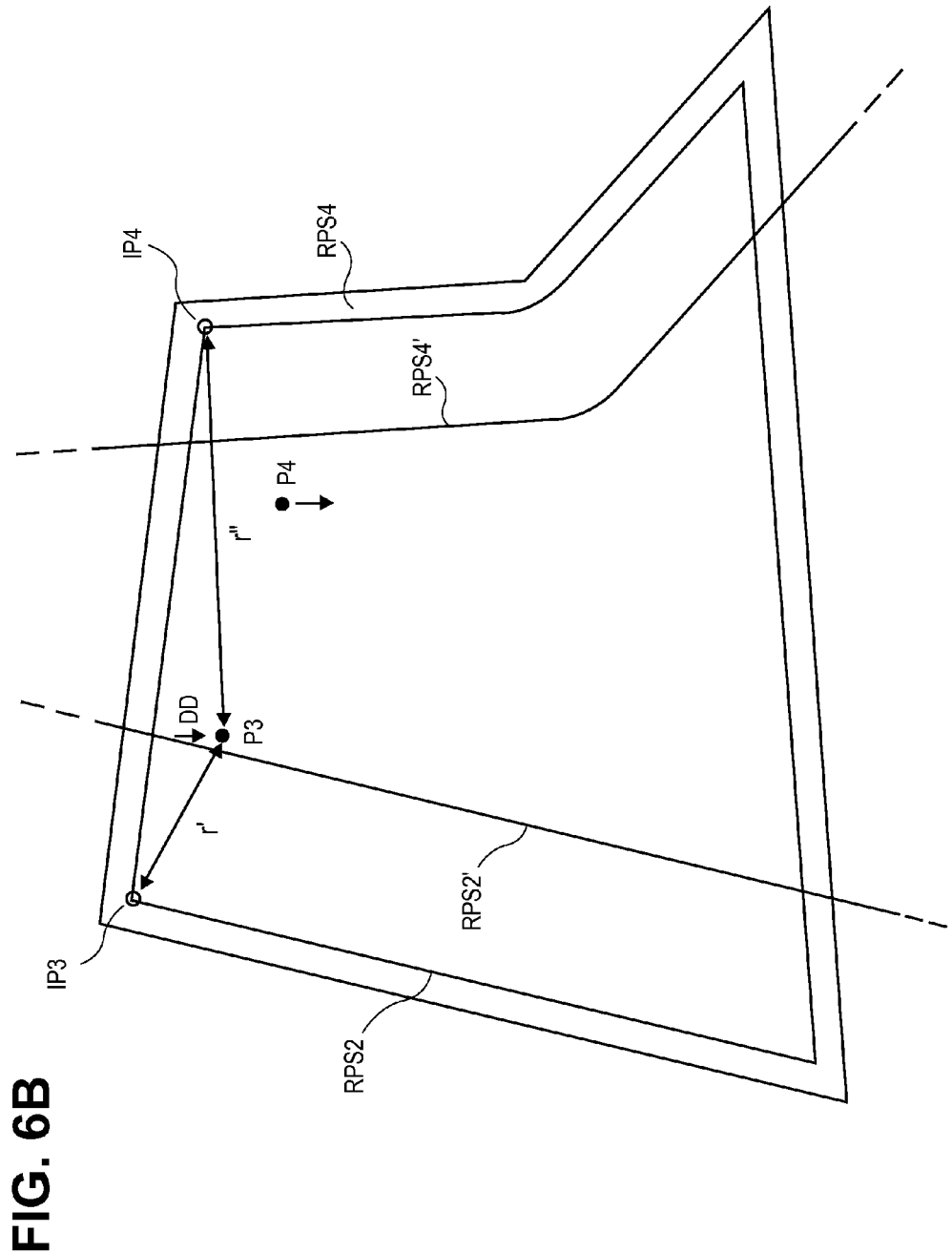

According to another method of selecting the next path segment to be driven, the system calculates distances between the vehicle's current position and all intersection points (IP1 . . . IPx) and uses the smallest distance to select a guidance target, as illustrated in FIG. 6b. By way of example, if the vehicle is in the position shown as point P3, the system virtually connects the point P3 with next intersection points IP3 and IP4 resulting two distances r' and r". The connecting line of P3 to intersection point IP3 has the smaller distance r' with the respective path segment RPS2' and is selected as guidance target. If, for example, the vehicle would be at point P4 the system may choose the other segment RPS4'.

Figure 6C:
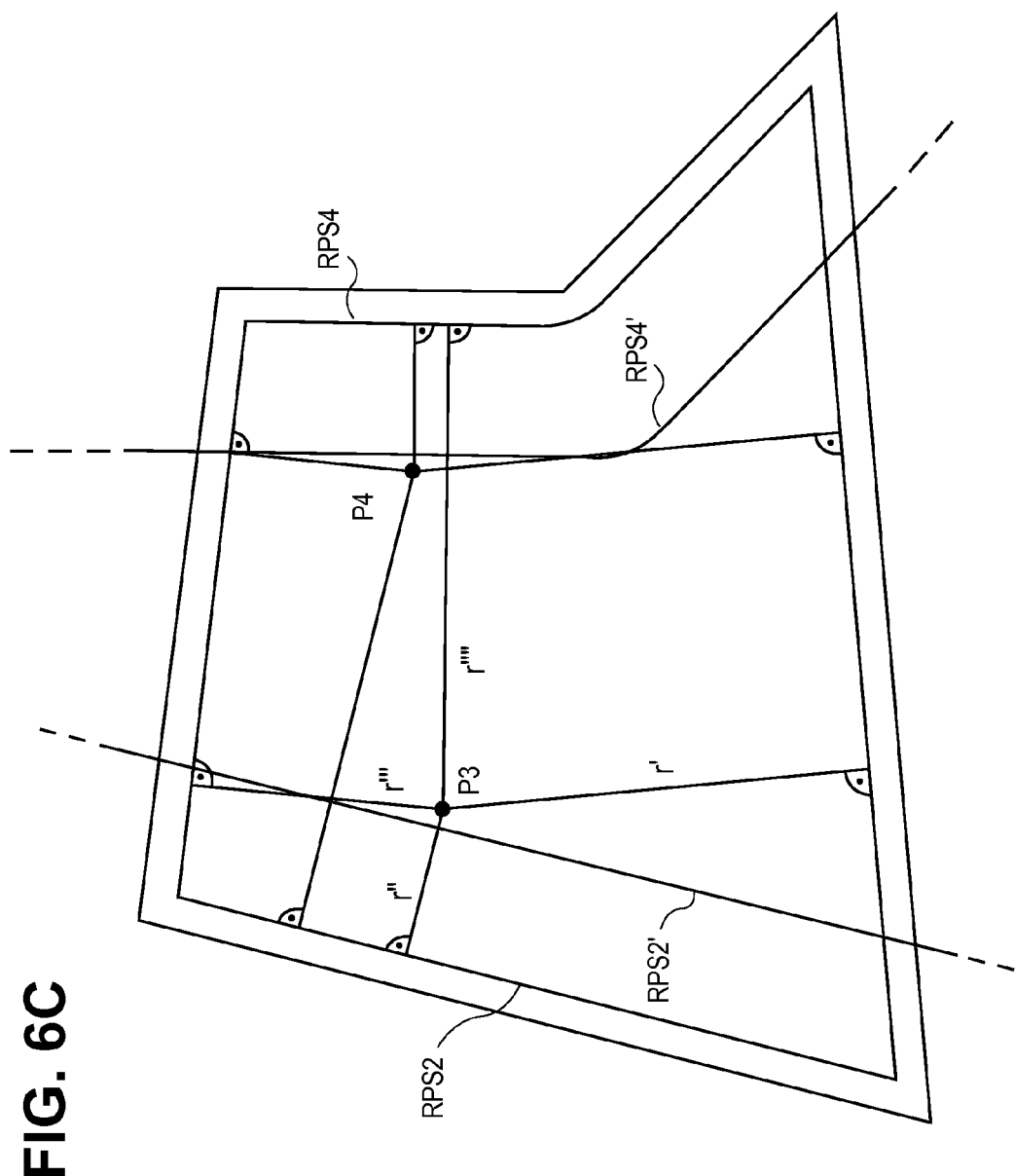

According to another method of selecting the next path segment to be driven, the system calculates the perpendicular distances between the vehicle's position and all contour segments and considers the one with the smallest distance to be taken. As illustrated in FIG. 6c, if the vehicle is in the position shown as point P3 the system virtually connects the point P3 with contour segments RPS1 through RPS4 which results in the distances r' through r"". The connecting line of P3 to contour segment RPS2 has the smallest distance r" and therefore the subsequent segment RPS2' is selected as guidance target. If, for example, the vehicle would be at point P4 the system may choose the other segment RPS4'. Alternatively, the perpendicular distance may be determined relative to subsequent path segments RPS1' through RPS4'.

Figure 6D:
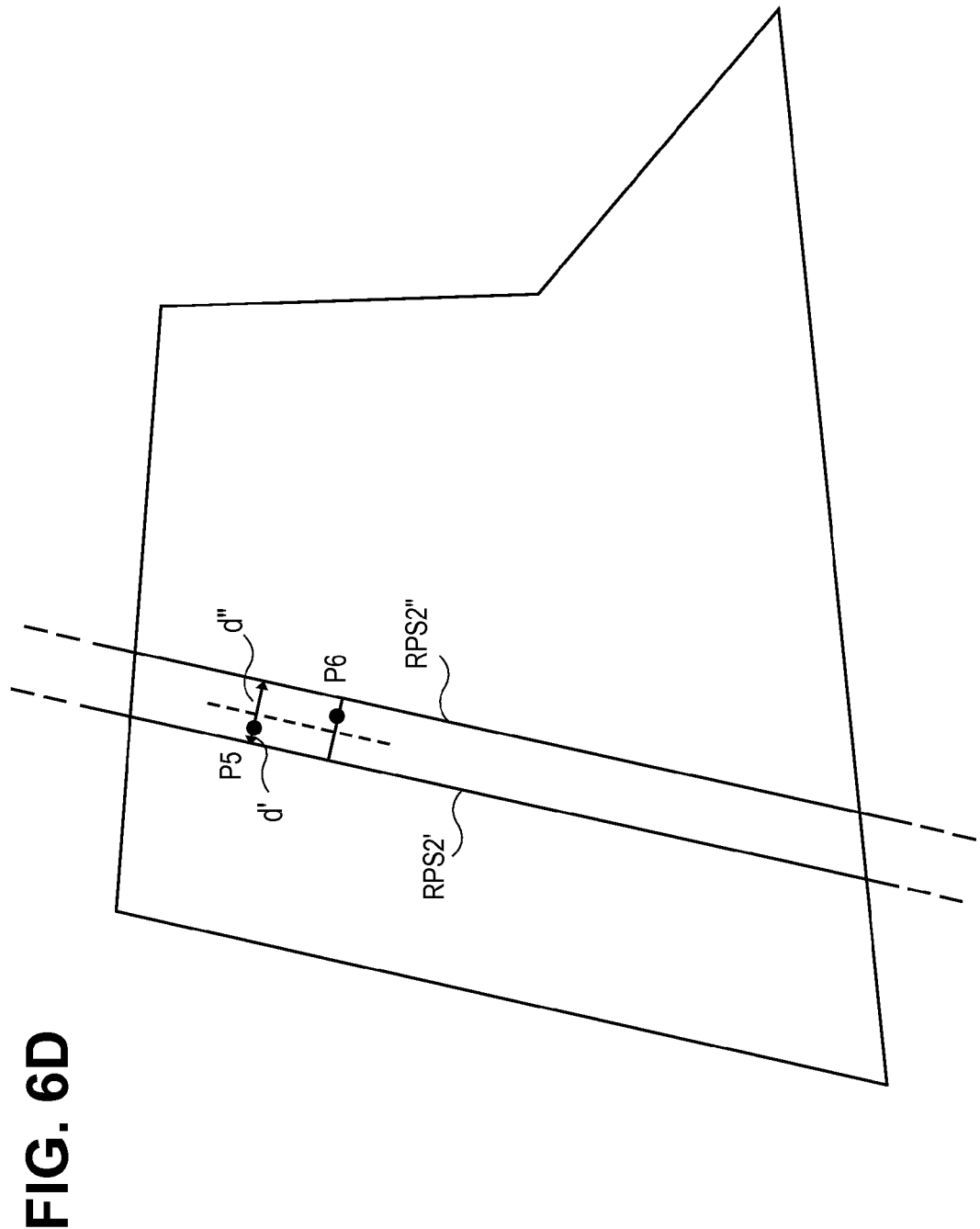

According to another method of selecting the next path segment to be driven, the system determines the perpendicular distance to a calculated path (Cross track; XTRK). As illustrated in FIG. 6d, if the vehicle is in the position shown as point P5, the system virtually connects perpendicularly the point P5 with next calculated paths RPS2' and RPS2" resulting in two distances d' and d". The connecting line P5 to path RPS2' has the smaller distance d' and is selected as the guidance target. If, for example, the vehicle would be at point P6 the system may choose the other segment RPS2".

Figure 7:
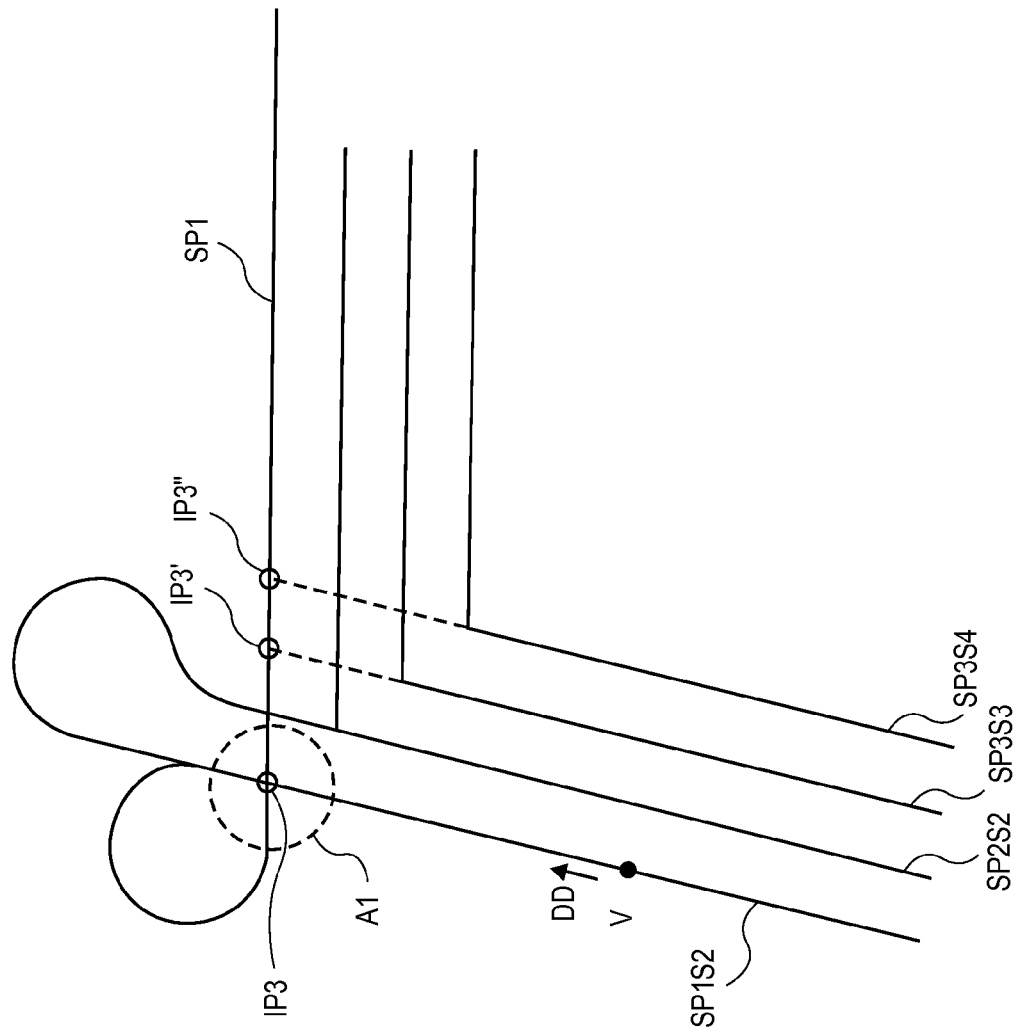

After determining the next path line segment the system can automatically activate automatic guidance mode such as, for example, when the vehicle exits a predefined area A1 around an intersection point IP defined by a radius, as shown in FIG. 7.

Furthermore, the system may also be provided with provisions if the vehicle leaves an initial segment when the driver manually adjusts steering before reaching an intersection point IP. If this happens within a predetermined area around an intersection point IP, the system may activate automatic guidance again according to the procedures described above. If it happens outside of the predetermined area around the intersection point IP, the system does not reactivate automatic guidance. This function is provided, for example, for scenarios in which the driver starts a headland maneuver before reaching an intersection point IP. The predetermined area around the intersection point IP is defined to prevent the automatic reactivation of the guidance system if the driver wants to leave the field or something unanticipated/undesired happens. In these cases the automatic return to guidance mode must be avoided. In addition, a visual and/or audible warning etc. may be generated.

The system may additionally be configured to recognize a change in the driver's strategy and switch to a parallel "SEGMENT" mode based on the above described advanced CONTOUR mode. This new strategy would be that the vehicle has to work on the parallel segments SP2S2, SP3S3, SP4S4 and so forth To ensure that all the field is worked, the system geometrically extends SP2S2 on both segment ends to create new intersection points IP3', IP3" and so forth with SP1S3 of the contour path line SP1 representing the end of the area to be worked in a parallel "SEGMENT" mode. The newly created intersection points IP3', IP3" and so forth are then used to automatically abort and resume automatic guidance. This switch in strategy enables the driver to drive the CONTOUR path around until reaching the mid of the field OR follow the CONTOUR path partly and then switch to the SEGMENT mode.

Looking now at a display related to this new path line determination, the segmentation offers the possibility of reducing the volume of information shown in the terminal. Only the current segment and the next segments (left and right) are shown in full detail, the rest of the path is faded-out. If the vehicle advances to a next intersection point the system may fade-in or highlight this segment. Thereby, the maps shown can be reduced and improve clarity.

Figure 8:
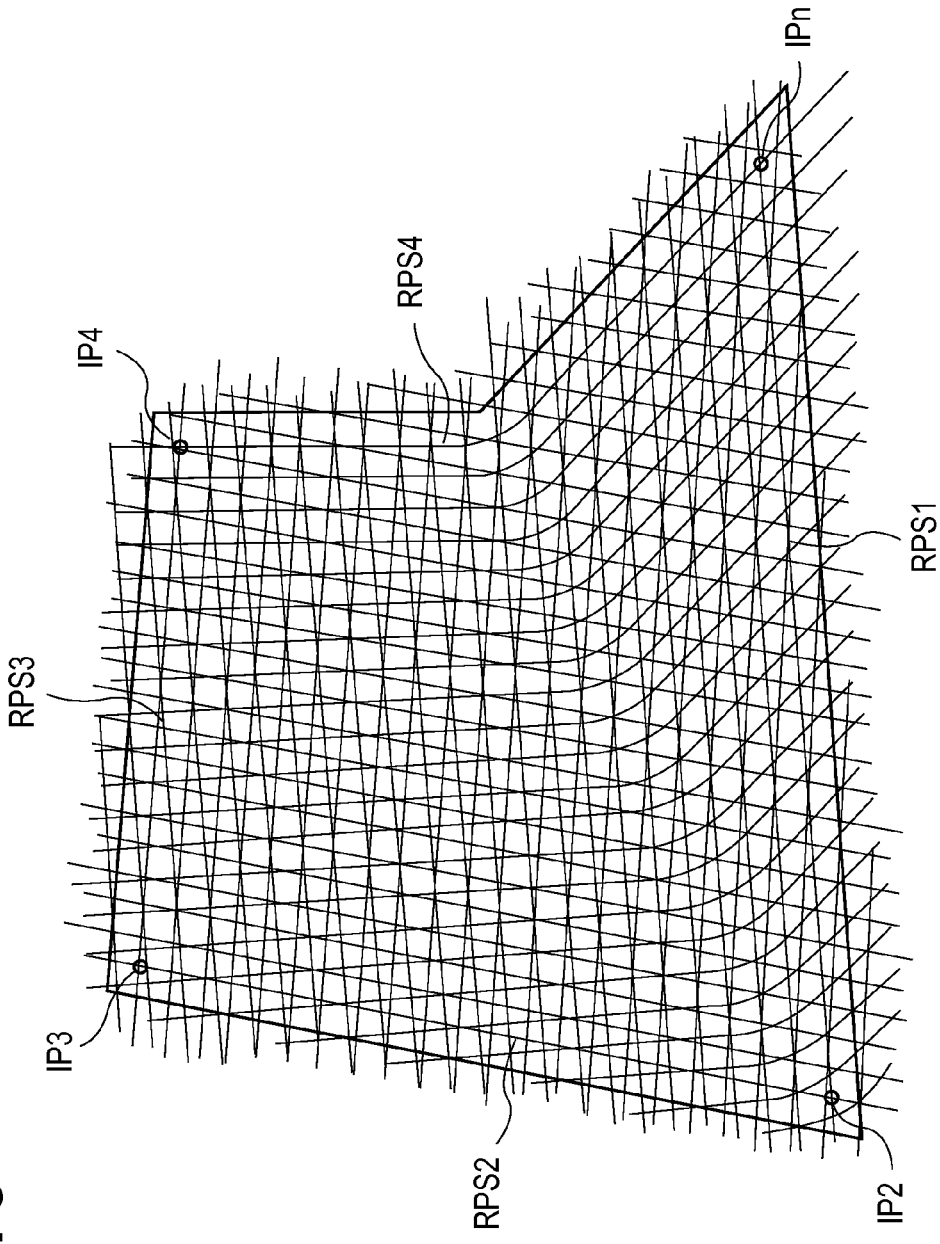
Figure 9:
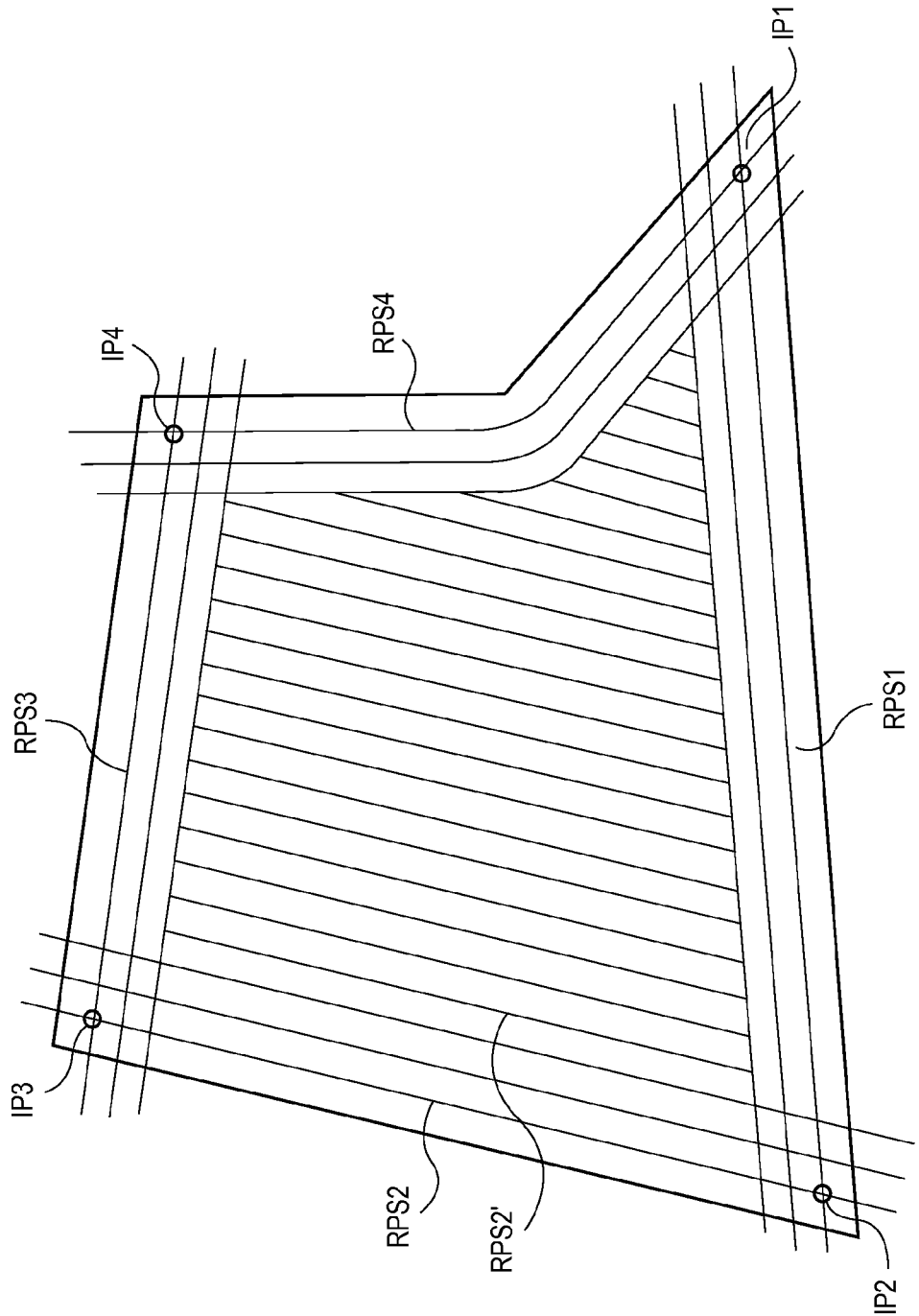

There are two different working modes: 1) The field is worked from all sides of the field (FIG. 8). 2) The field is separated into a headland portion and an inner field (FIG. 9). The user may have to define the number of orbits (that is, the number of times the vehicle travels around the field when working the headland portion) and the contour section (field side) the inner part of the field should be worked.

To summarize, the system offers an automatic guidance operation for complex contour lines based on segmented path lines whereby there is no need to manually change the wayline, and whereby manual headland turns are possible without requiring manually aborting and resuming the guidance mode. This reduces the actions required by the driver. Furthermore, the path line definition is more flexible so that the driver can change between CONTOUR mode into a "SEGMENT" mode similar to A/B mode.

The segmented path line method can also be used to improve headland management. An automated headland management system may be configured to perform one of two different functions: A) Automated headland sequences: Reaching a headland boundary or a defined distance from it, an automatic sequence can be started to, for example, lift a plough or stop a seeder and vice versa—engage the plough or start the seeder when entering from a headland area to a work area. B) Automated headland driving: In addition to starting sequences, a system may also control steering and propulsion to drive the tractor in the headland. The operator can select different headland path strategies including, for example, circular headland paths (HP1), reversing headland paths (HP2) or key-hole headland paths (HP3).

Currently available headland management systems require the definition of a distance to a predefined boundary to start the automated headland function. Due to the requirement of a defined boundary, the systems are mainly used for parallel line driving as one boundary line can be taken to define headland exit and entry. Furthermore, as a distance to the boundary is defined once, a quite even boundary is required so that the settings for the headland path line can be defined once. Systems using the CONTOUR mode and automated headland system are not available yet.

Figure 10:
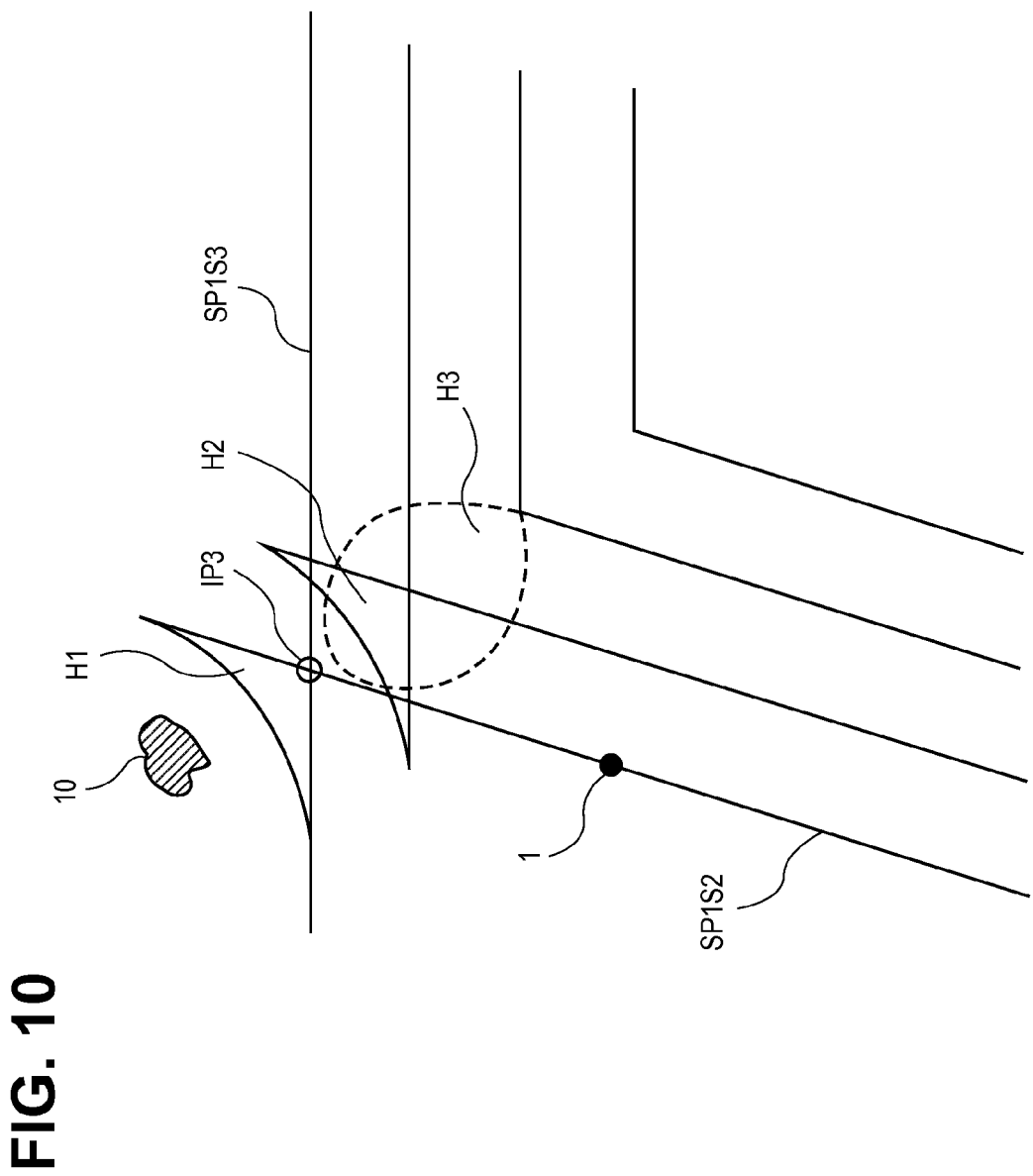

Referring to FIG. 10, the automated headland system is controlled by using the segmented path line SP1S2 and SP1S3 and intersection point IP3. When the vehicle approaches intersection point IP3 the automatic headland system including configured to perform functions A) and B), described above, is automatically started. In case of option A) the automatic steering would be aborted, the driver would manually drive the headland similar to HP2 until returning to the next segment to restart automatic guidance mode. Due to the segmentation the headland system can cope with non-parallel path lines.

In case of option B) with automated driving and complex field geometry, the system can additionally select different headland path strategies depending on non-traversable areas. For example, the first headland H1 can only be passed using a reversing headland path HP2 to avoid collision with obstacle 10. The next headland H2 may also be a reversing headland path HP2. Looking now at headland H3 the distance to the obstacle is now enlarged so that a circular headland path HP1 or key-hole headland path HP3 may be chosen to save fuel and time (as braking and reversing is not necessary).

To summarize, contoured path segmentation offers the advantage of integrating headland management for non-parallel path lines and additionally may help to select the appropriate headland path depending on obstacles, defined contour lines and so forth.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method comprising:
    driving a vehicle along a path, wherein the driven path includes a plurality of path segments and driving along the path includes turning a rounded corner between consecutive path segments, executing a headland maneuver between consecutive path segments, or both, each of the path segments being straight or presenting one or more curved sections with a radius of curvature greater than a predetermined reference radius;
    automatically defining, with a computing device on the vehicle, a plurality of contoured path segments corresponding to the driven path segments but excluding rounded corners between consecutive path segments and headland maneuvers between consecutive path segments;
    for each contoured path segment, automatically determining, using the computing device, one or more intersection points with one or more other contoured path segments;
    automatically defining, with the computing device, a contoured reference path as a sequence of the intersecting contoured path segments, the contoured path having sharp corners where the contoured path segments intersect;
    automatically defining, with the computing device, a subsequent path based on the reference path, the subsequent path including a sequence of intersecting contoured path segments, the subsequent path having sharp corners where the contoured path segments intersect, each of the subsequent path segments corresponding to one of the reference path segments but being offset therefrom;
    for each subsequent path segment presenting a curved section, using the computing device to automatically compare a radius of curvature of the curved section to the predetermined reference radius;
    if the radius of curvature of the subsequent path segment is less than the predetermined reference radius, using the computing device to automatically divide the subsequent path segment into two segments and replacing the curved section with a sharp corner between the two segments; and
    using an automated guidance system to automatically guide the vehicle along the subsequent path.

2. The method as set forth in claim 1, the step of defining the contoured path segments of the reference path including extending the ends of at least one driven path segment based on the heading followed while driving the vehicle along the driven path segment.

3. The method as set forth in claim 1, further comprising identifying at least one of the start and end of a reference path segment by detecting a manual trigger by an operator of the vehicle while driving along the path.

4. The method as set forth in claim 1, further comprising identifying the end of a reference path segment by detecting the path turning through a radius of curvature less than a predetermined reference radius.

5. The method as set forth in claim 1, further comprising identifying an end of a reference path segment by detecting a crossing point of the driven path with itself.

6. The method as set forth in claim 1, the steps of defining the plurality of contoured path segments, determining the one or more intersection points, and defining the contoured path being performed automatically by the automatic guidance system as the vehicle is driven along the path.

7. The method as set forth in claim 1, the steps of defining the plurality of contoured path segments, determining the one or more intersection points, and defining the contoured path being performed automatically by the automatic guidance system while the guidance system is operating in a contour guidance mode, wherein the guidance system remains in the contour mode even when the vehicle transitions from one driven path segment to another.

8. An automatic guidance system associated with a vehicle, the system comprising:
 a position determining mechanism;
 a data storage device; and
 a data processing device in communication with the position determining mechanism and the data storage device, the data processing device configured to—
  as the vehicle drives along a path, define a plurality of contoured path segments corresponding to driven path segments but excluding rounded corners between consecutive driven path segments and headland maneuvers between consecutive driven path segments, each of the driven path segments being straight or presenting one or more curved sections with a radius of curvature greater than a predetermined reference radius;
  for each contoured path segment, determine one or more intersection points with at least one other contoured path segment;
  define a contoured reference path as a sequence of the intersecting contoured path segments, the contoured reference path having sharp corners where the contoured path segments intersect;
  define a subsequent path based on the contoured reference path, the subsequent path including a sequence of intersecting contoured path segments, the subsequent path having sharp corners where the contoured path segments intersect, each of the subsequent path segments corresponding to one of the reference path segments but being offset therefrom;
  for each subsequent path segment presenting a curved section, compare a radius of curvature of the curved section to the predetermined reference radius;
  if the radius of curvature of the subsequent path segment is less than the predetermined reference radius, divide the subsequent path segment into two segments and replacing the curved section with a sharp corner between the two segments.

9. The automatic guidance system as set forth in claim 8, the data processing device configured to define the contoured path segments by extending the ends of at least one driven path segment based on the heading followed by the vehicle driving along the driven path segment.

10. The automatic guidance system as set forth in claim 8, wherein the data processing device identifies at least one of the start and end of a contoured path segment in response to a manual trigger by an operator of the vehicle while driving along the path.

11. The automatic guidance system as set forth in claim 8, wherein the data processing device identifies at least one of the start and end of a contoured path segment in response to the path turning through a radius of curvature less than a predetermined reference radius.

12. The automatic guidance system as set forth in claim 8, wherein the data processing device identifies an end of a driven path segment in response to the driven path crossing itself.

13. The automatic guidance system as set forth in claim 8, the data processing device configured to automatically define the plurality of contoured path segments, determine the one or more intersection points, and define the contoured path as the vehicle is driven along the path.

14. The automatic guidance system as set forth in claim 8, the data processing device configured to automatically define the plurality of contoured path segments, determine the one or more intersection points, and define the contoured path while the guidance system is operating in a contour guidance mode, wherein the guidance system remains in the contour mode even when the vehicle transitions from one driven path segment to another.

15. The automatic guidance system as set forth in claim 8, further comprising a display configured to display only a portion of the contoured path proximate the vehicle.

16. The automatic guidance system as set forth in claim 8, the data processing device configured to automatically select a guidance target by calculating angles to adjacent path segments and selecting a path segment corresponding to a smallest angle.

17. The automatic guidance system as set forth in claim 8, the data processing device configured to automatically select a guidance target by calculating distances between the vehicle's position and intersection points of the contoured path and selecting an intersection point nearest the vehicle as the guidance target.

18. The automatic guidance system as set forth in claim 8, the data processing device configured to automatically select a guidance target by calculating a perpendicular distance between the vehicle's position and each of a plurality of path segments and selecting a path segment corresponding to the smallest perpendicular distance as the guidance target.

* * * * *